Figure 1:
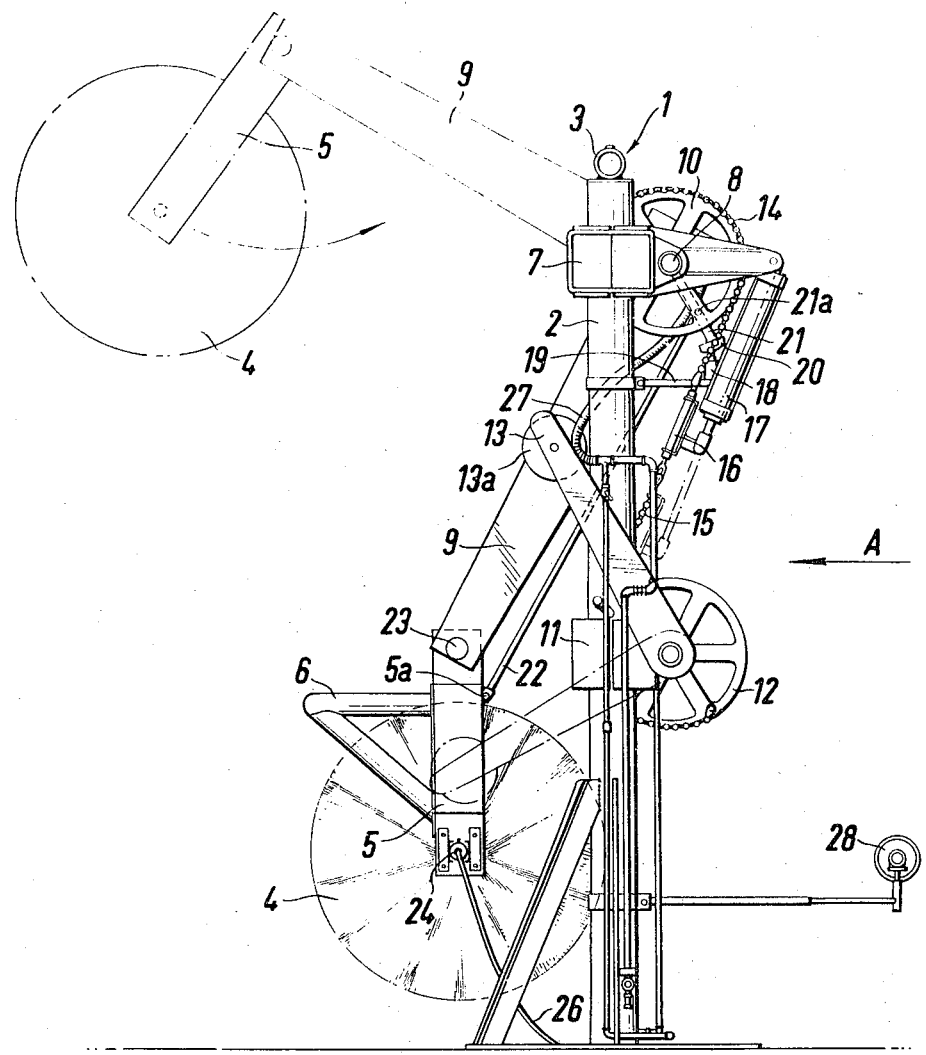

Dec. 20, 1966    E. MAXWELL    3,292,192
VEHICLE CLEANING APPLIANCE
Filed Aug. 10, 1965    4 Sheets-Sheet 1

INVENTOR
BY
ATTORNEY

United States Patent Office 3,292,192
Patented Dec. 20, 1966

3,292,192
VEHICLE CLEANING APPLIANCE
Eustace Maxwell, Edinburgh, Scotland, assignor to 4-Minute Car Wash Company Limited, Edinburgh, Scotland, a British company
Filed Aug. 10, 1965, Ser. No. 478,542
Claims priority, application Great Britain, Aug. 11, 1964, 32,583/64; June 21, 1965, 26,074/65
10 Claims. (Cl. 15—21)

This invention relates to improved vehicle cleaning appliances and in particular to appliances for cleaning substantially all the upwardly, forwardly and rearwardly directed surfaces of a vehicle. For the sake of simplicity in the ensuing description these surfaces of a vehicle will be called "upper surfaces."

Vehicle cleaning appliances are known in which a cleaning member rotating about a horizontal axis is mounted in a support means so that the height of the rotating axis of the member above a vehicle conveyor or roadway may be varied to effect cleaning of the upper surfaces of the vehicle. Heretofore it has been usual to counterweight the cleaning member and to allow it to fall under gravity against the vehicle surfaces or else to employ a torque motor to urge the cleaning member against the vehicle. With these prior proposals it has been known to employ sensing rollers associated with the cleaning member to ensure that an excessive pressure does not arise during a cleaning operation between the cleaning member and the vehicle being cleaned. It has now been discovered that improved cleaning can be obtained by positively controlling the vertical movement of the cleaning member in response to contact pressure between the member and the vehicle surface.

According to the present invention, a vehicle cleaning appliance comprises stand means, a vehicle-engaging cleaning member, a first support means movably mounted on the stand means, a second support means pivotally mounted about a horizontal axis on the first support means and supporting the vehicle-engaging member so that it lies substantially horizontally across the path of a vehicle passing the stand means and motive means coupled to said support means and responsive to contact pressure between the member and a vehicle, whereby said member rises and falls to follow closely the contour of the vehicle during relative motion between the vehicle and the stand means.

The stand means may comprise spaced-apart pillars defining a vehicle passageway therebetween, each pillar pivotally supporting the first support means, with the second support means pivotally attached between ends of the first support means so that the cleaning member extends horizontally across the passageway. The cleaning member is conveniently a circular cylindrical brush or pad. Alternatively, the stand means may comprise a pair of spaced-apart inclined tracks, the first support means being in the form of a carriage movable along each track and the second support means being in the form of two spaced-apart arms each pivoted to a different one of the carriages and supporting therebetween the cleaning member.

The cleaning member and support means are conveniently counterpoised on the stand means so that the force necessary on the support means to raise or lower the cleaning member is reduced to the minimum. In this way, the load on the motive means can be correspondingly reduced.

Control of the motive means to raise or lower the cleaning member may be effected by way of a mechanical linkage attached to the second support means and operating a control member of the motive means whenever the second support means is deflected from a rest position by contact between the cleaning member and a vehicle.

A deflection of the second support means from its rest position (as a result of increasing contact pressure between the cleaning member and a vehicle), is employed to control the height of the member and thus to ensure that the member closely follows the contour of a specific part of the surface of the vehicle.

Conveniently the appliance comprises spray means for applying water to the surface of a vehicle prior to engagement between the vehicle and the cleaning member. Water supply to the spray means may be switched on by a vehicle-sensing means disposed on that side of the stand means which first approaches, or is approached by, a vehicle during relative movement between the vehicle and the stand means.

Where the stand means employ inclinded track, if the inclined tracks solpe downwardly in the direction of vehicle travel along the passageway, the cleaning appliance is particularly suitable for cleaning the rear end of a vehicle and if the inclined tracks slope upwardly in the direction of vehicle travel along the passageway, the cleaning appliance is particularly suitable for cleaning the front end of a vehicle.

Figure 2:
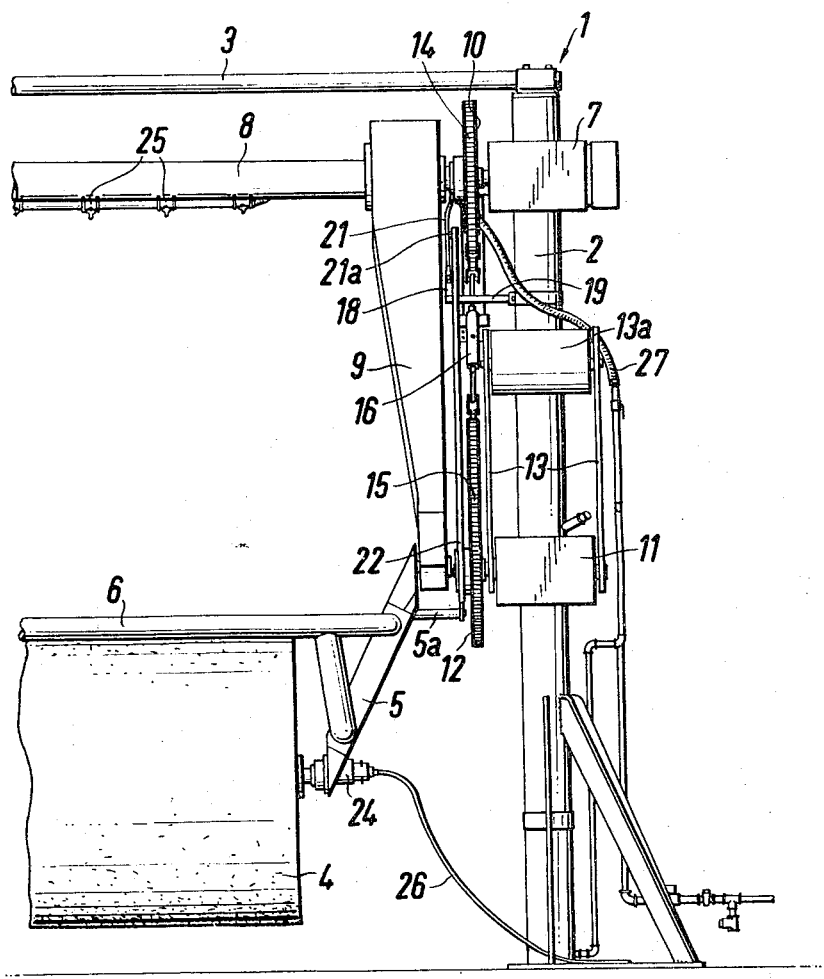
Figure 3:
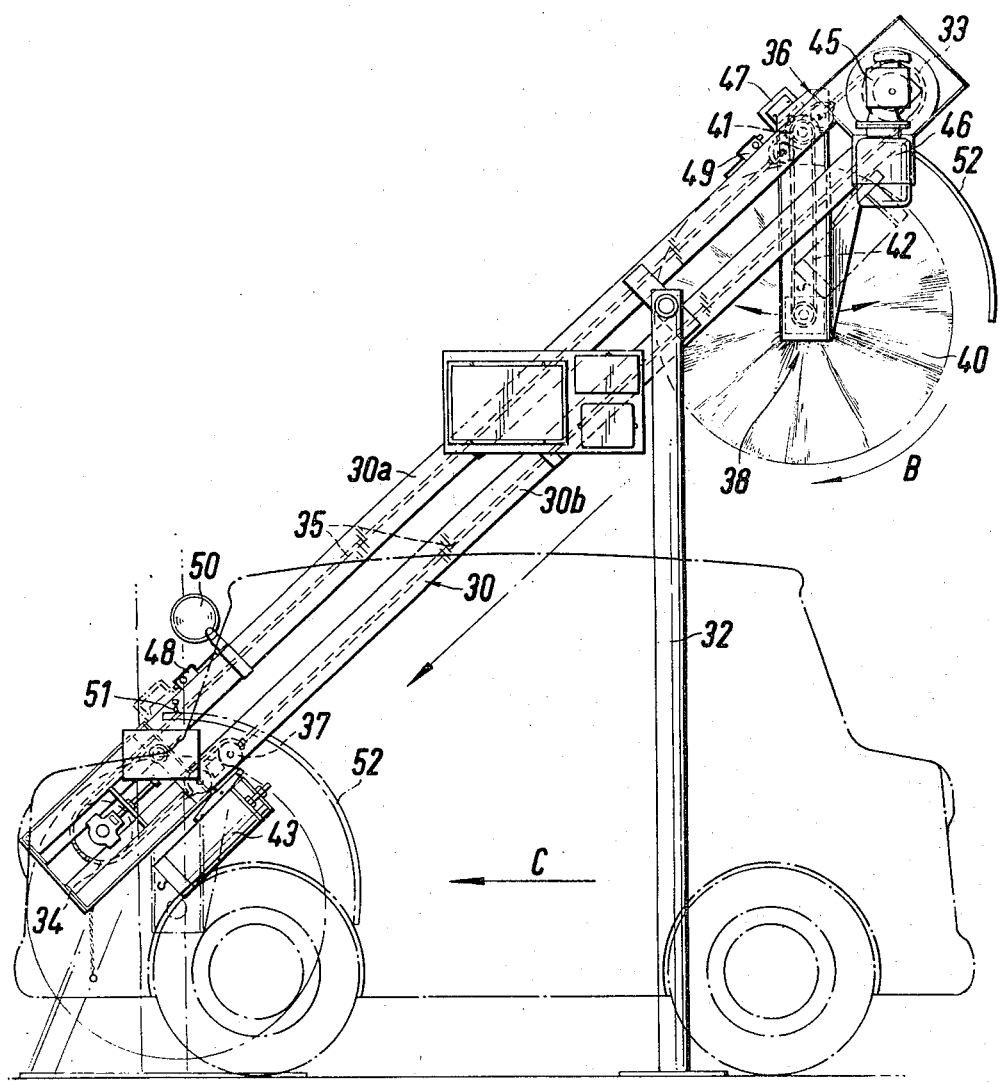
Figure 4:
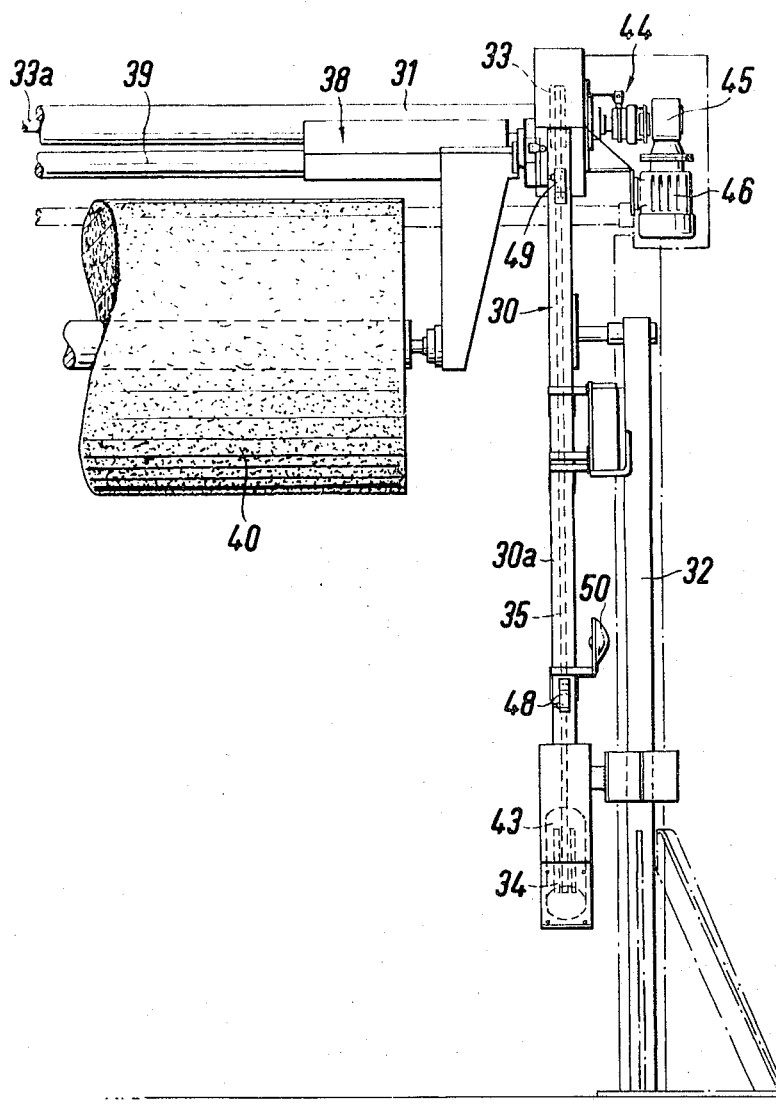

Two forms of vehicle cleaning appliance in accordance with the invention will now be described by way of example, with reference to the accompanying drawings, in which FIGURE 1 is a side elevation of a first form of appliance in whch the first support means is a spaced-apart pair of pivoted arms, FIGURE 2 is partial front elevation of the appliance of FIGURE 1, FIGURE 3 is a side elevation of a second form of appliance in which the first support means is a pair of carriages running on inclined tracks, and FIGURE 4 is a partial front elevation of the appliance of FIGURE 3.

The appliance shown in FIGURES 1 and 2 comprises a gantry-shaped stand means (generally designated 1) formed from spaced-apart tubular pillars 2 and a linking tie-tube 3. The opening within the stand means 1 defines a vehicle passageway through which a vehicle passes to be cleaned.

Extending across the passageway is a cylindrical brush 4 mounted with its axis horizontal and rotatably supported at the ends of two spaced-apart support arms 5. The support arms 5 are linked together by a transverse framework 6 which is located wholly above the horizontal plane passing through the axis of the brush 4.

Adjacent the upper end of each pillar 2 is a bearing block 7 and pivotally mounted, with one end in each bearing block, is a transverse spindle 8 on which is non-rotatably mounted a spaced-apart pair of parallel supports 9. Rotatably mounted at the lower end of each of the supports 9 is one of the support arms 5, so that the brush 4 depends from the end of the supports 9.

Non-rotatably secured to the spindle 8, close to one end thereof, is a toothed pinion 10 and rotatably mounted in a bearing 11 on the same pillar is a second toothed pinion 12 which is coupled to a spaced pair of radially extending weighted balance arms 13. Two lengths of chain 14, 15 are secured one to each of the pinions, each length meshing with the respective pinion for a portion of its length, and the two lengths being connected by an adjustable bridge 16 to form a non-extensible linkage between the rotatably mounted supports 9 and the balance arms 13. By suitable choice of a weight 13a between the arms 13 and by adjusting the relative angular relationships of the arms 13 and the supports 9, it is possible to counterbalance the assembly of brush 4, transverse framework 6, support arms 5 and supports 9 to an extent such that only a small residual turning moment remains urging the brush downwards in an anti-clockwise direction as shown in FIGURE 1.

Mounted on one of the pillars 2, is a pneumatic cylinder and piston assembly 17, the piston of which is coupled to the bridge piece 16 forming part of the linkage to the balance arm 13. The cylinder assembly 17 is coupled to a compressed air supply (not shown) via a regulator valve 18 mounted on a bracket 19 secured to one of the pillars 2. The actuating member of the regulator valve 18 is in contact with a cam plate 20 forming an extremity of an operating arm 21 pivotally mounted about the axis of the transverse spindle 8. The operating arm 21 is coupled to the adjacent support arm 5 by means of a connecting rod 22 pivoted at its ends about axes 21a and 5a and extends parallel to the support 9. The shape of the cam plate 20 is such that any substantial deflection of the brush 4 from a rest position in which the axis of the brush 4 lies in the same vertical plane as the axis 23 of the pivoting connection between the support 9 and the support arm 5 (i.e. the truly pendant position), results in movement of the piston of the assembly 17 in a direction to lift the brush 4, powered movement of the piston continuing so long as the brush 4 remains appreciably deflected from the truly pendant or rest position.

The pivoting axes 8, 23, 21a and 5a form a parallelogram so that irrespective of the angular relationship between the supports 9 and the pillar 2, the arm 21 moves only when the arm 5 is deflected from the vertical.

In the specific appliance described, the brush 4 is rotated by a pneumatic motor 24 and a spaced array of spray nozzles 25 is located along the spindle to direct water into the passageway and thus over the upper surfaces of a vehicle passing therethrough. The air line for the motor 24 is shown at 26 and the supply pipe for the spray nozzles at 27.

Control of the water supply to the nozzles 25 (which may be detergent-augmented if desired) and of the air supply to the brush motor 24 is effected by a photo-electric sensing device 28 mounted on the pillar 2 and detecting the approach of a vehicle to the appliance.

The cessation of water and air supplies are effected by electric switch means (not shown) actuated when the supports 9 return to their lowest position.

The appliance operates as follows:

As a vehicle approaches the gantry-shaped stand means, in the direction of the arrow "A," the photo-electric sensing device 28 is tripped. The brush motor 24 is started and a curtain of water spray is generated from the nozzles 25 in the passageway approached by the vehicle. As soon as the front end of the vehicle touches the rotating brush 4 (resting in its lowest position as shown in full lines in FIGURE 1) part of the weight of the brush is borne by the vehicle, and as a result of the counterbalancing of the brush by the arms 13 and weight 13a, the brush rises. The rate of rise of the brush, under the influence of the weighted balance arm 13, may be sufficient to enable the brush 4 to follow closely the contour of the upper surfaces of the vehicle, but wherever the rate of rise of the brush under the influence of the balance arm 13 is not adequate for a particular contour of the vehicle, the brush will be displaced from its truly pendant position and the pneumatic cylinder and piston assembly 17 will augment the rate of rise of the brush. As the vehicle proceeds through the passageway, the brush makes light contact with the upper surfaces of the vehicle the brush rising with pneumatic assistance whenever contact pressure between the brush and the vehicle surface increases above a certain minimum value and falling slowly under gravity whenever the contact pressure decreases below the minimum value. In this way, the brush engages all the upper surfaces of the vehicle, finally dropping behind the vehicle into its lowermost position and thereby shutting off the water supply to the spray nozzles and the air supply to the brush motor. The appliance is then ready for the arrival of the next vehicle.

A second embodiment of cleaning appliance in accordance with the invention is illustrated in FIGURES 3 and 4 and is specifically designed for cleaning the rear end of a vehicle.

In this embodiment, the stand means takes the form of a pair of spaced-apart inclined tracks 30 tied together by a tie-tube 31 at their upper ends and supported by stanchions 32 (only one of which is shown). Each track 30 is formed by a pair of parallel channel-section members 30a and 30b, the channels of which open towards the vehicle passageway past the appliance. The tracks 30 slope downwardly in the direction of vehicle travel along the passageway.

Rotatably mounted at the upper and lower ends of each track 30 is a pinion 33 and 34, respectively, and an endless chain 35 passes around these pinions in meshing engagement therewith. The upper pinions 33 of each track 30 are connected together on a shaft 33a coaxial with the tie-tube 31. The upper flight of the chain 35 of each track 30 is contained within the channel of the respective member 30a and the lower flight is contained within the channel of the respective member 30b. Incorporated in the upper flight of each chain 35 is a brush carriage 36 and incorporated in the lower flight of each chain is a counterweight carriage 37, each of the four carriages being provided with rollers running in the channel of the appropriate member 30a or 30b.

Extending between the two carriages 36 (only one of which is shown in the drawings) is a bearing bar 39 pivotally supporting at each end a pair of brush-supporting frames generally designated 38. Rotatably mounted in the frames 38 is a cylindrical brush 40, the axis of the brush extending horizontally between the tracks 30. The brush is rotated in the direction shown by arrow B in FIGURE 3, by an electric motor 41 and an endless chain 42.

Attached to each carriage 37 (only one shown) is a counterweight 43 the counterweights being just not sufficient to balance the weight carried by the carriages 36, so that if the pinions 33 are free to rotate, the brush 40 will sink down the inclined tracks with its axis maintained horizontal, to a lowest position (shown in chain lines in FIGURE 3) while the counterweights will rise to positions close to the top of the tracks 30.

Rotation of the pinions 33 is controlled by an electromagnetic clutch (generally designated 44) intermediate the shaft 33a and the output shaft of a non-reversible gear-box 45 coupled to an electric motor 46.

When the clutch 44 is engaged, movement of the carriages 36 is controlled by the motor 46, the carriages 36 remaining stationary if the motor 46 is not energised and rising against the pull of gravity when the motor is energised. When the clutch is dis-engaged, the carriages 36 sink slowly down the tracks 30.

The electromagnetic clutch 44 is energised by way of a micro-switch 47 fixedly mounted with respect to one of the tracks 30. The actuating member of the micro-switch 47 bears against a cam surface formed on the adjacent frame 38. The cam surface is shaped so that any pivoting of the frame 38 about the bar 39 from the pendant position, actuates the clutch and couples the pinions 33 to the gear-box 45.

Mounted on the upper member 30a of one of the tracks 30 close to the lower end is a micro-switch 48. The switch 48 is positioned to be engaged by the brush assembly when the brush 40 is in its lowest position. The switch 48 is employed to stop the brush motor 41, engage the electromagnetic clutch 44 and energise the motor 46, thus raising the carriages 36 to the top of the tracks.

Adjacent the upper end of one of the tracks 30 is a micro-switch 49, which on actuation by the brush assembly, stops the motor 46 but leaves the clutch 44 engaged.

The appliance embodies a photo-electric device 50 for sensing the approach of a vehicle, and spray means (not shown) for directing water or weak detergent solution onto the brush or vehicle surface.

The appliance illustrated operates in the following way:

For convenience, it will be assumed that the carriages 36 are in their uppermost position on their respective tracks 30 and that the motors 41 and 46 are switched off and the spray means is turned off. The photo-electric device 50 senses when a vehicle moving in the direction of the arrow C, is positioned below the brush 40, and generates a signal which starts the brush motor 41, turns on the spray means and releases the electromagnetic clutch 44. The carriages 36 move down the inclined tracks 30 under their own weight until the brush 40 engages the uppermost surface of the vehicle with a contact pressure sufficient to deflect the frames 38 from their normal pendant position relative to the bearing bar 39, into a deflected position in which the associated cam-operated switch 47 is actuated to engage the electromagnetic clutch 44 and arrest the fall of the carriages. When the contact pressure between the brush 40 and the vehicle surface falls sufficiently to allow the frames 38 to again approach their pendant position, the switch 47 releases the clutch 44 so that the carriages move downwardly once more. In this way, the brush 40 can be made to closely follow the rear end surfaces of the vehicle as it moves along the passageway until the carriages 36 reach their lowest position.

At this lowest position, the lower track switch 48 is actuated and after a short delay, the spray ceases, the brush motor 41 is stopped and the motor 46 is energised to lift the carriages 36 up to the top of the tracks 30 where the upper track switch 49 is actuated to stop the motor 46. The cleaning appliance is then reset for the arrival of the next vehicle.

As a precaution against a vehicle first engaging the brush when the carriages 36 are in their lowest position, a safety switch 51 may be employed to give warning or to stop the passage of the vehicle. The safety switch may conveniently be actuated by a guard member 52 mounted above and behind the brush 40.

A modified form of cleaning appliance specifically designed for the front end surfaces of a vehicle can be provided by reversing the inclination of the tracks 30 so that they incline upwardly in the direction of vehicle travel. The brush-supporting carriages would start in their lowest position and would be over-counterweighted so that when the electromagnetic clutch is dis-engaged by a deflection of the brush from the pendant position, the brush would rise slowly up the tracks under the influence of gravity. Thus as a vehicle passes below the brush, the brush rises to contact the front end surfaces and to maintain a substantially uniform contact pressure on the vehicle surfaces. When the carriages are sufficiently high for the brush to clear the highest point of the vehicle, the electric motor powering the endless chains would automatically return the brush to its lowest position after the vehicle has passed, the appliance then being reset for the arrival of the next vehicle.

What is claimed is:

1. A vehicle cleaning appliance comprising stand means, a vehicle-engaging cleaning member, a first support means movably mounted on the stand means, a second support means pivotally mounted about a horizontal axis on the first support means and supporting the vehicle-engaging member so that it lies substantially horizontally across the path of a vehicle passing the stand means and motive means coupled to said support means and responsive to contact pressure between the member and a vehicle, whereby said member rises and falls to follow closely the contour of the vehicle during relative motion between the vehicle and the stand means.

2. An appliance as claimed in claim 1, in which the stand means comprises spaced-apart pillars defining a vehicle passageway therebetween, each pillar pivotally supporting the first support means, with the second support means pivotally attached between ends of the first support means so that the cleaning member extends horizontally across the passageway.

3. An appliance as claimed in claim 1, in which the stand means comprises a pair of spaced-apart inclined tracks, the first support means being in the form of a carriage movable along each track and the second support means being in the form of two spaced-apart arms each pivoted to a different one of the carriages and supporting therebetween the cleaning member.

4. An appliance as claimed in claim 2, in which the cleaning member and support means are counterpoised on the stand means so that there is a residual gravitational force on the cleaning member tending to cause the latter to sink to its lowest position.

5. An appliance as claimed in claim 1, in which the motive means to vary the height of the cleaning member is controlled by a mechanical linkage attached to the second support means and operating a control member of the motive means whenever the second support means is deflected from a rest position by contact between the cleaning member and a vehicle.

6. A vehicle cleaning appliance comprising a stand defining a vehicle passageway, a first support means movably mounted on the stand, a second support means pivotally depending from the first support means, a cleaning member rotatably mounted on the second support means, means to rotate the cleaning member about a horizontal axis extending across the passageway, and means for positively controlling the height of the axis of rotation of the cleaning member in response to deflections of the member from its pendant position.

7. A vehicle cleaning appliance as claimed in claim 6, in which the first support means is a spaced-apart pair of arms pivotally mounted on the stand counterweighted to have a residual turning moment due to gravity in a direction effecting a lowering of the cleaning member, and power means operative to elevate the arms when and only when the cleaning member is deflected from its pendant position.

8. A vehicle cleaning appliance as claimed in claim 6 in which the stand is a spaced-apart pair of inclined tracks defining the passageway therebetween and the first support means is a pair of carriages running on the tracks.

9. A vehicle cleaning appliance as claimed in claim 8, in which the carriages are counterweighted to fall only slowly under the influence of gravity, stop means being provided to arrest the fall of the carriages when the cleaning member is deflected from its pendant position.

10. A vehicle cleaning applicance as claimed in claim 8, in which the carriages are over counterweighted so that they ride slowly up the tracks under the influence of gravity, normally-operative stop means being provided to arrest the rise, said means being rendered inoperative when and only when the cleaning member is deflected from its pendant position.

References Cited by the Examiner

UNITED STATES PATENTS

| | | |
|---|---|---|
| 2,610,342 | 9/1952 | Griffiths. |
| 2,803,025 | 8/1957 | Morison. |
| 3,035,293 | 5/1962 | Larson. |
| 3,060,473 | 10/1962 | Vani. |

FOREIGN PATENTS

| | | |
|---|---|---|
| 1,196,147 | 5/1959 | France. |

CHARLES A. WILLMUTH, *Primary Examiner.*

E. L. ROBERTS, *Assistant Examiner.*